Jan. 14, 1941.    R. T. HOWES    2,228,353
DEHYDRATOR
Filed June 4, 1937

Inventor
Raymond T. Howes
By
Attorney

Patented Jan. 14, 1941

2,228,353

UNITED STATES PATENT OFFICE 2,228,353

DEHYDRATOR

Raymond T. Howes, Los Angeles, Calif., assignor, by mesne assignments, to Triple A Dehydrator Company, Los Angeles, Calif., a corporation of California Application June 4, 1937, Serial No. 146,386

1 Claim. (Cl. 252—349)

This invention relates generally to methods and apparatus for breaking crude petroleum oil emulsions and separating the emulsions into their component parts of oil and water. More particularly this invention relates to a mechanical method of breaking crude oil emulsions and the apparatus for carrying out this method.

The treatment of crude oil emulsions has largely been carried out by four general methods, namely; heat, chemical mechanical and electrical. Various combinations of these methods have also been used. While the majority of crude oil emulsions are usually of the water in oil type, emulsions vary greatly in different oil fields and in some instances in different parts of the same field. Some emulsions are in a "loose" state, that is, the water is distributed throughout the oil in rather large globules, while others are what are called "tight" emulsions, that is, the water is distributed throughout the oil in very fine globules. The so-called "tight" emulsions are particularly hard to break and much difficulty has been experienced in treating such emulsions. The above indicated methods of treating emulsions have been used with varying success upon different types of emulsions. However, attempts to break emulsions by a purely mechanical means, as by passing oil through filters of various material, have not been entirely successful in producing a clean oil or one that would meet the ordinary purchasing company's buying requirements (usually a maximum of 3% water).

Therefore it is a primary object of this invention to provide a mechanical method and apparatus for breaking crude oil emulsions so that the oil and water components of the emulsion will substantially separate. In this connection it is a particular object to provide a method and apparatus for carrying out the method whereby a crude oil emulsion may be broken and clean oil produced having a minimum of water content. It is an object to accomplish this without the use of chemicals in treating certain types of emulsions and to accomplish this with the use of only a relatively small amount of chemicals in the treatment of certain other types of emulsions less responsive to a purely mechanical treatment.

It is also an object of this invention to provide a method and apparatus for breaking crude oil emulsions which is sufficiently simple and positive that it may be applied to the flow line from wells and produce "pipe line oil."

In view of the fact that most crude oil emulsions are of the water in oil type it is a particular object of this invention to provide as part of the apparatus for carrying out the above objects, apparatus capable of distorting and piercing or puncturing the film of oil and emulsifying agent surrounding the globules of water and of subsequently coalescing the released globules of water.

These and other objects are apparent from the accompanying drawing and the following description. Referring to the drawing which is for illustrative purposes only:

The crude oil in its emulsified state is pumped or otherwise forced into the heater A at the intake pipe 11 and passes through the heater where its temperature is raised to between 90° and 150° F. The temperature to which the oil is raised depends upon the type of oil being treated. Thus, if a low gravity oil is to be treated it necessarily must be heated to a higher temperature than one having a high gravity. The heater may be of any suitable type, such as is commonly used for heating emulsions prior to treatment.

Figure 2:
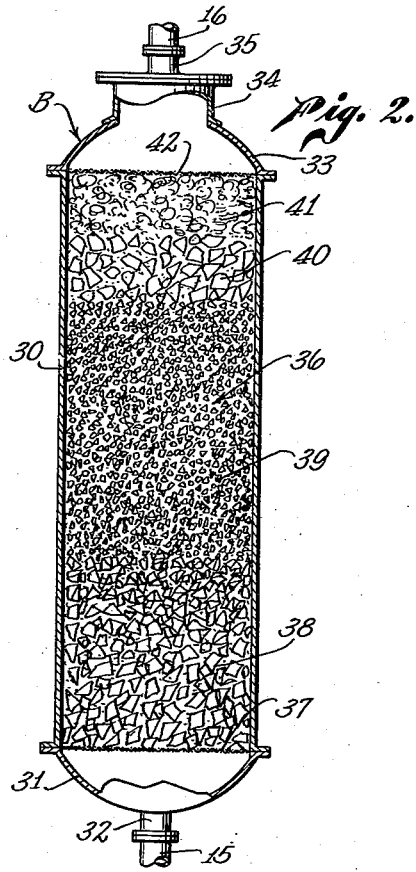
Fig. 2 is an enlarged sectional elevation of a preferred form of distortion cell.

On leaving the heater A the oil flows out of a discharge fitting 12 through the pipe 13 to a four-way valve 14 which is shown as directing the fluid into pipe 15 which connects with the lower end of what may be termed a distortion cell B. In passing through this distortion cell the emulsion is broken into its component parts of oil and water as will subsequently be described in detail in connection with the description of the distortion cell, a sectional elevation of which is shown in Fig. 2 of the drawing. The mixture of crude oil and free water flows out of the top of the distortion cell and is conveyed by pipe 16 to the four-way valve 14 through which it passes into pipe 17 communicating with the inlet 18 of a settling tank C. The settling tank is provided with discharge pipe 19 for the clean or dehydrated oil. A suitable discharge conduit 20, connected near the bottom of the tank C is provided for drawing off accumulated water. The tank is also provided at the top with a suitable gas relief valve generally indicated by reference numeral 21.

For the purpose of keeping the water level in the tank at a predetermined point, a water discharge means is provided which comprises a stand pipe 22 which communicates with the interior of the tank at 23 and is provided with rotatable couplings 24 which permit vertical adjustment of the pipe. The pipe 22 is open at its top and is provided with a discharge pipe 25 which communicates with it and which discharges into a suitable trough member 26 from which water may be conducted to any suitable point by a pipe 27. The various couplings 24 in the pipe 22 permit vertical adjustment of the pipe so as to maintain the opening into the discharge pipe 25 at any desirable height.

It is to be understood that certain types of crude oil may be treated successfully by merely passing them through the distortion cell B and then conducting them into the settling tank C without passing the oil through the heater A to raise its temperature. Other types of oil may require heating prior to passing through the distortion cell to secure successful dehydration of the oil. Certain types of crude oil emulsions which are particularly difficult to treat by a mere mechanical method of breaking an emulsion may require the addition thereto of relatively small amounts of chemical reagents to facilitate the breaking of the emulsion. These chemicals may be added by any of the usual well known methods at any suitable point prior to the passage of the emulsion through the distortion cell.

Figure 1:
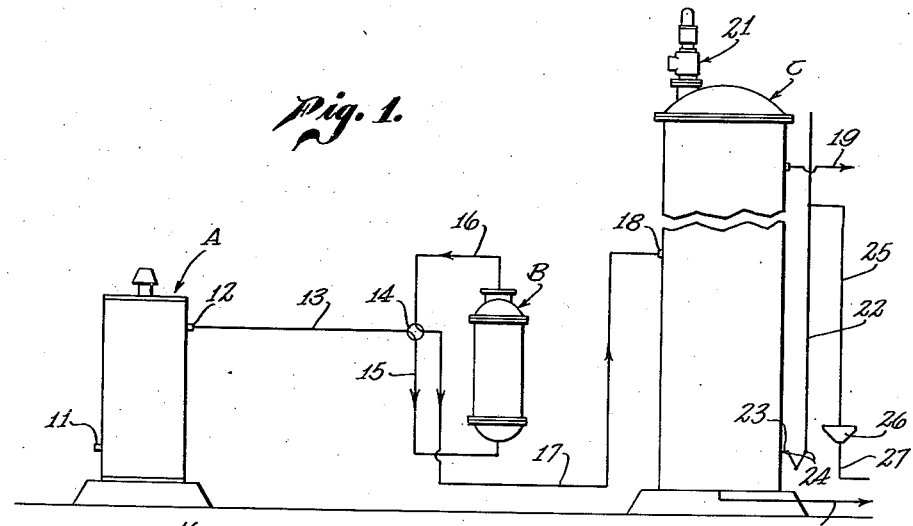
Fig. 1 is a diagrammatic view of a preferred form of apparatus used in carrying out the invention, showing the flow of liquid through the apparatus.

Referring to Fig. 2 for details of the construction of a preferred form of distortion cell, reference numeral 30 indicates a cylindrical shell which is provided with suitable bottom closure 31 in which is mounted an inlet fitting 32 into which the crude oil emulsion is conducted by means of pipe 15 which communicates with the heater A as described in connection with Fig. 1. The top of the shell is provided with a closure member 33 which terminates in an enlarged fitting 34. Establishing communication between the interior of the fitting 34 and the discharge pipe 16 is a fitting 35.

It has been suggested that one of the primary objects in this invention is the provision of means for distorting and piercing, or puncturing, the film or envelope of oil and emulsifying agent surrounding the globules of water in the ordinary type of crude oil emulsions, and for carrying out this object the interior of the shell 30 is packed with ground glass, or crushed glass particles, generally indicated by reference numeral 36. At the lower end of the shell 30 is provided a screen 37 above which is positioned a bed of coarse glass particles 38. The particles are graded in size from one inch down to about 10 mesh, the coarser material being placed at the bottom. Resting on top of this bed is a bed of relatively fine ground glass particles 39 which preferably pass a 20-mesh screen and are retained on a 30-mesh. Above this is another bed of relatively coarse glass 40 varying in size from particles of on inch down to particles of approximately 10-mesh size. Above this bed of glass is placed a layer of porous material 41 such as wood wool or glass wool, which serves to hold the ground glass in place. A screen 42 serves to retain the excelsior or glass wool in place.

It has been found that this ground glass filled distortion cell is effective to break up most emulsions with the aid of little or no chemical emulsion-breaking reagents. The entrapped globules of emulsion (usually water) tend to assume spherical form under normal conditions. It is believed that when an emulsion passes between the minute particles of glass each globule of entrapped liquid is distorted from its normal spherical form until the surrounding film is broken or is pierced and ruptured. In this connection it is to be understood that the particles of glass used in the cell are fractured, uneven, sharp-edged particles and not round or granular. The passages or interstices between the particles are thus extremely small and irregular and form a plurality of tortuous passages for the emulsion to pass through. Glass, being preferably water-wettable tends to coalesce the water and prevent re-emulsion.

By reason of the fact that the passages or interstices in the beds of glass are of extremely minute size, the velocity of flow of liquid through the distortion cell is very low and the water, separated from the oil, tends to remain in the distortion cell. The separated oil thus passes up through a bath of water. When the distortion cell is completely filled with water, except for incoming emulsion, a mixture of oil and free water passes from the cell and is conducted by pipes 16 and 17 into the settling tank C through the fitting 18.

In connection with the distortion cell there is provided the above referred to four-way valve 14 by which the flow of liquid may be reversed through the distortion cell in the event that the cell becomes clogged, in order to restore its effectiveness, although from actual experience in commercial operations over a period of eight months it has not been found necessary to do this.

Figure 3:
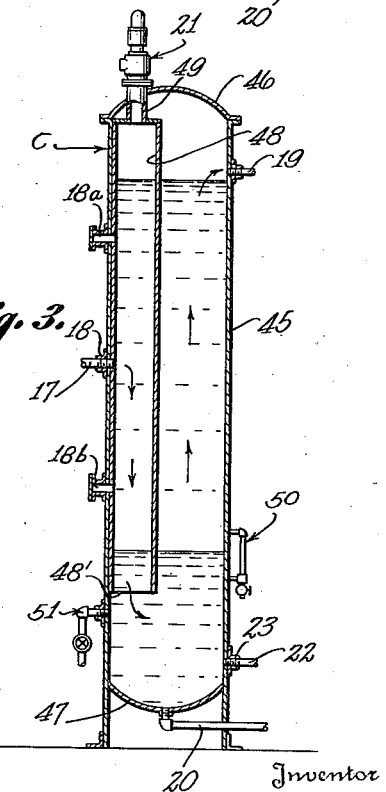
Fig. 3 is a sectional elevation of a preferred form of settling tank.

Referring to Fig. 3 for details of the construction of the settling tank, reference numeral 45 indicates a cylindrical shell having a top closure 46 and a bottom closure 47. This shell is provided with an internal stand pipe 48 spaced from the bottom of the tank and which is open at its lower end 48' to the interior of the shell. At the upper end of the internal stand pipe 48 is a fitting 49 extending through the top closure 46 and which terminates in a suitable gas relief valve 21.

The tank C is provided with suitable inlet connections 18, 18a and 18b, and, for the purpose of illustration, the inlet 18 is shown as being connected with the pipe 17 leading from the distortion cell. The inlets 18a and 18b are shown capped, but may be used in place of the inlet 18, it being optional at what point the fluid enters the tank. A gauge glass 50 is provided for the purpose of checking the water level in the tank. The tank is also supplied with a sample cock 51.

In the operation of the device, crude oil emulsion is pumped or otherwise forced into the heater A where it is raised to the desired temperature. This temperature varies from 90° to 150° F. depending on the type of emulsion. The emulsion is then conducted from the heater to the lower end of the distortion cell and is forced through the sharp-edged particles of glass therein, and emerges at the top in the form of a mixture of oil and free water, the emulsion having been broken. The mixture of oil and water is conducted from the distortion cell into the settling tank C. The mixture is introduced into the stand pipe 48 and, in order to reach the outlet of the tank, the oil must flow downwardly in the stand pipe below its lower edge 48' and up exteriorly of the stand pipe to the outlet 19, the path taken by the oil being indicated by the arrows in Fig. 3. It is thus seen that when the mixture enters the stand pipe 48 in the settling tank, any gas evolved is given opportunity to escape through the relief valve 21, the oil and water in a non-emulsified state passing downwardly in the stand pipe, the water settling in the bottom of the tank. The water level is preferably maintained a short distance above the lower end of the stand pipe so that the oil must pass through a bath of water before it can reach the outlet 19.

The oil, in passing through the settling tank as above described, drops in temperature and is discharged from the tank at approximately 90° F. so that any oil vapors separated during the heating operation and subsequent passage through the distortion cell are condensed and mix with the clean oil.

In actual commercial apparatus the invention above described has been successful in treating crude petroleum having a water content ranging from 25% to 60% with a resultant water content of from .2% to 1.8%.

I claim as my invention:

A method of breaking a crude oil emulsion of the water-in-oil type which comprises providing a confined composite bed of sharp-edged glass particles having upper and lower layers of sharp-edged particles of over 10 mesh size and an intermediate layer of sharp-edged particles of from 20 to 30 mesh size, forcing the emulsion upwardly through said bed, and collecting the resultant mixture of oil and water apart from said bed for gravity separation of the components of the emulsion.

RAYMOND T. HOWES.